GEORGE H. PEACOCK.
Improvement in Permutation-Locks.

No. 127,706. Patented June 11, 1872.

Witnesses.
Fred A. Peacock
Chas L. Peacock

Inventor:
George H. Peacock.

UNITED STATES PATENT OFFICE.

GEORGE H. PEACOCK, OF WEBSTER, NEW YORK.

IMPROVEMENT IN COMBINATION LOCKS.

Specification forming part of Letters Patent No. 127,706, dated June 11, 1872.

SPECIFICATION.

*To all whom it may concern:*

Be it known that I, GEORGE H. PEACOCK, of Webster, in the county of Monroe and State of New York, have invented certain Improvements in Combination Locks, of which the following is a specification:

The first part of my invention relates to the combination of the knob-stem, arm, and circular-toothed rim in such a manner that the position of the arm, and consequently the position of the part or parts moved by it, may be determined by knowing the number of teeth over which the outer end of the arm has passed, as indicated by the light jarring sensation produced in the operation. The second part of my invention has reference to the combination of the knob-stem, arm, and wheels, so that the wheels may be turned in either direction by moving the said arm; also that the knob-stem and arm may be turned in either direction without moving the wheels. The third part of my invention pertains to the general combination of the bolt, wheels, knob-stem, spring-arm, and circular-toothed rim.

*Description of the Accompanying Drawing.*

Figure 1:
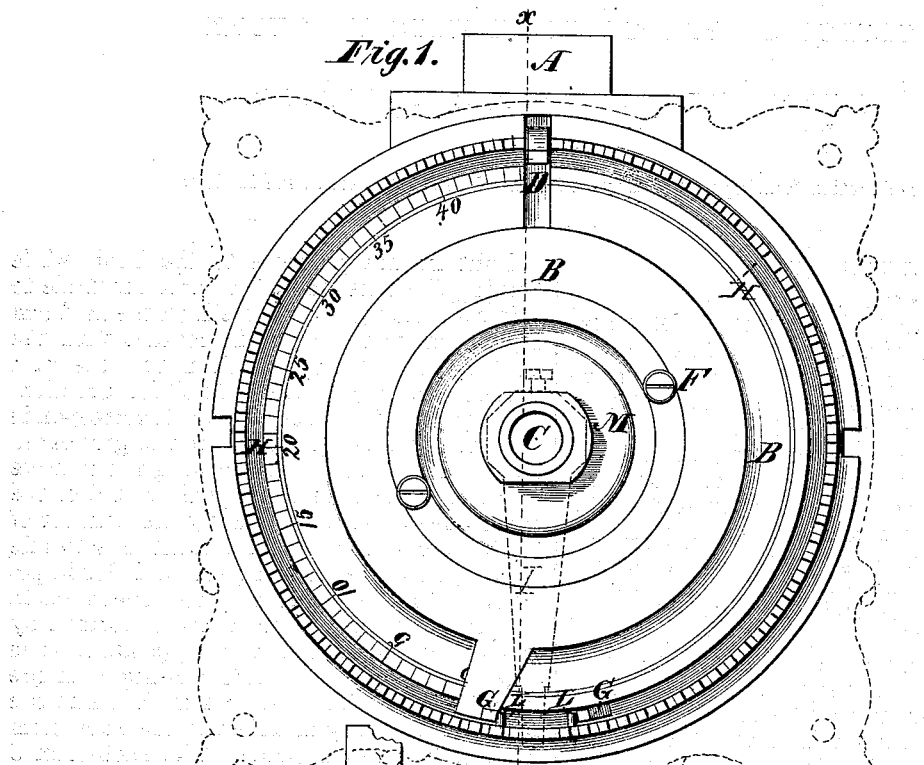
Figure 3:
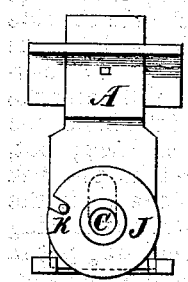
Figure 2:
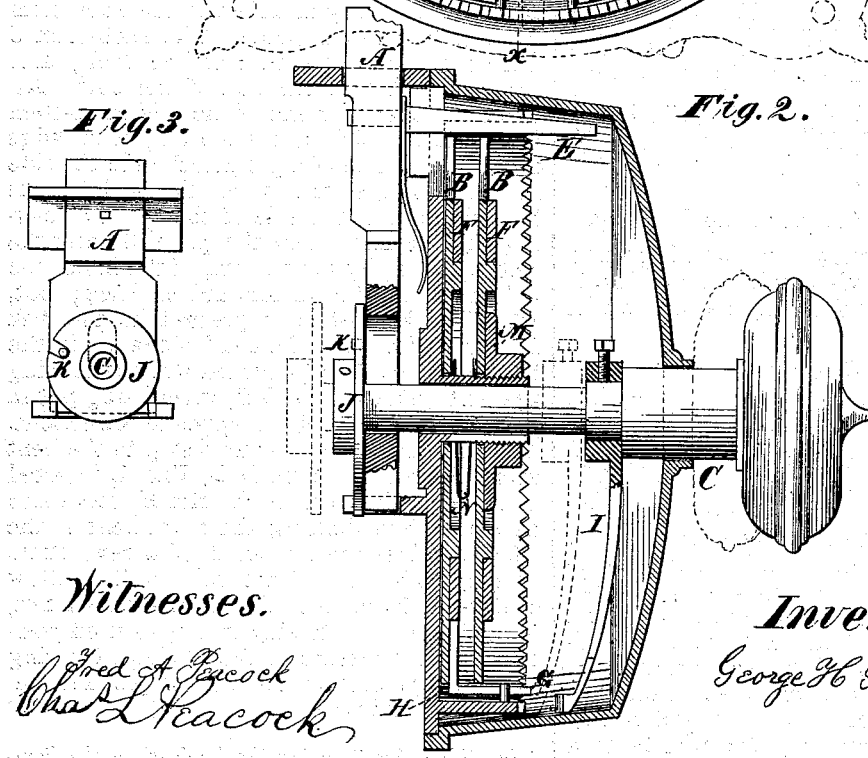

Figure 1 is a front view of the working parts. Fig. 2 is a sectional view on line x x of Fig. 1. Fig. 3 is a back view showing the bolt and its operating disk.

*General Description.*

Attached to the outside of the back plate is the bolt A, Fig. 2. Projecting forward from the center of the back plate is a hollow pin, on which turn the wheels B B, Fig. 2, and through which hollow pin passes the knob-stem C. The said wheels have each a slot, D, as shown in front wheel, Fig. 1, for the admission of the bolt-guard E, Fig. 2, when the said bolt is thrown back. They each have also a graduated index and movable collar F, adjusted with set-screws. These collars are each provided with a bent arm, G, extending beyond the periphery of the wheel to which they are attached. Encircling the wheels is a raised rim or flange, H, having its outer edge toothed. Attached with collar and set-screw to the said knob-stem C is an arm, I, the outer end of which passes over the toothed rim H when the knob-stem is turned. By applying a light inward pressure to the knob while turning, the outer end of the arm I is made to ride over the face of the teeth on the said rim H, and may be brought in contact with the bent arms G G, by which means the said wheels B B may be turned in either direction. The number of teeth on the rim H corresponds with the number of marks on the graduated scale of the wheels, thus showing the relative position of the bent arm G to the slot D of the same wheel, and consequently the number of teeth over which the arm must pass while turning the wheel to bring the said slot in position so that the bolt may be thrown back. The arm I is made of steel, and so formed by being made thin between the opposite ends as to admit of the outer ends passing over the inequalities of the toothed rim H, while the inner end is firmly attached to the knob-stem moving on an even plane. The knob-stem C passes through the case of the lock; also through a slot in the heel of the bolt. Attached to the inner end of the said knob-stem is a disk, J, which has a slot, K, in its edge for the admission of a pin attached to the side of the bolt A, so that when the said disk is brought against the side of the bolt by drawing out the knob-stem the pin will enter the slot K, when, by the turning of the knob, the bolt may be thrown forward or back; but, when the knob-stem is pressed in, the disk J is carried beyond the head of the pin in the bolt, and may then be turned without moving the bolt. The wheels B B, when being put in position, are turned in opposite directions. The bolt-guard E serves as a stop to the bent arms G, and the pins L L, Fig. 1, inserted nearly opposite to it in the rim H, serve also as stops, thus limiting the movement of the wheels to less than one-half of a revolution. The said wheels B B are held on the hollow center-pin by means of a broad-headed nut, M, and are made to stay in any desired position by the pressure of the U-shaped spring N, Fig. 2, placed on the hollow pin and between the said wheels.

*Directions for Opening the Lock when the Combination is known.*

While gently pulling on the knob turn to the right or left until the bolt-pin enters the slot K in the disk J, which will indicate the position of the spring-arm I; then pressing the knob just enough to carry the disk J beyond the head of the bolt-pin, turn with a gentle pull, as before, either to the right or left, as far as possible, or until the outer end of the spring-arm comes in contact with the bolt-guard E; then press the knob in and turn back with a light pressure as far as possible, or until the bent arm G strikes the pin L in the toothed rim. One of the wheels will then be turned back as far as possible. Repeating this operation reversely, or in the opposite direction, will turn the other wheel as far as it can go. Now, knowing the number to which each wheel is set, first draw out the knob, turning to the right or left until the bolt-pin enters the slot in the disk J to determine the position of the spring-arm; second, press the knob in, without turning, when the outer end of the spring-arm will stand in the space between the two bent arms; third, turn the knob gently, and with a light pressure, either to the right or left, counting the notches, indicated by the light jarring sensation, as will correspond with the number to which the wheel is set that is being moved; the slot D in the wheel will then stand in position for the bolt to be thrown back; fourth, turning back to starting point again, then turn gently, as before, but in the opposite direction, counting as many notches as will correspond with the number to which the wheel now being turned is set, then turning back to starting point or to where the bolt-pin will enter the slot of the disk J, draw out the knob and turn the knob to the right when the bolt will be thrown back, the wheels having been put in such position as to admit of the bolt-guard E entering the slots D.

Directions for Locking.

While gently pulling the knob, turn to the right or left until the bolt-pin enters the slot of the disk J; then turn the knob to the left, by which operation the bolt is thrown up. Next press the knob in until the disk J passes the head of the bolt-pin, then turn the knob to the right and left with light pressure, thus moving the wheels so that the bolt cannot be thrown back.

I lay no claim to the invention of locks with wheels to prevent the throwing back of the bolt, or to the invention of a lock operated by the turning of a knob; but What I do claim is as follows:

Claims.

1. The combination of the knob-stem C and spring-arm I with the toothed rim H for operating the wheels, substantially as set forth.

2. The sliding knob-stem C and arm I in combination with the wheels B B, adjustable collars F F, and arms G G, substantially as and for the purpose set forth.

3. The sliding knob-stem C, disk J, and bolt A in combination with the arm I, toothed rim H, and wheels B B, substantially as and the purpose set forth.

[NOTE.—The spring I has no function of itself. It is only in connection with other parts that it accomplishes anything.]

GEORGE H. PEACOCK.

Witnesses:
FRED A. PEACOCK,
OSCAR H. PEACOCK.